United States Patent
Kim (10) Patent No.: US 7,536,097 B2
(45) Date of Patent: May 19, 2009

(54) AUTOFOCUSING APPARATUS OF CAMERA AND AUTOFOCUSING METHOD THEREOF

(75) Inventor: Tae Eung Kim, Suwon (KR)

(73) Assignee: Samsung Electro-Mechanic Co., Ltd., Suwon-Si, Gyunggi-do (KR)

( * ) Notice: Subject to any disclaimer, the term of this patent is extended or adjusted under 35 U.S.C. 154(b) by 332 days.

(21) Appl. No.: 11/428,373

(22) Filed: Jun. 30, 2006

(65) Prior Publication Data

US 2007/0009249 A1   Jan. 11, 2007

(30) Foreign Application Priority Data

Jul. 11, 2005   (KR) ............... 10-2005-0062051

(51) Int. Cl.
*G03B 3/10* (2006.01)
*H04N 5/232* (2006.01)

(52) U.S. Cl. ...................... 396/121; 348/354

(58) Field of Classification Search ............. 396/121, 396/122–123; 348/345, 353, 354, 355, 356

See application file for complete search history.

(56) References Cited

U.S. PATENT DOCUMENTS

| | | | |
|---|---|---|---|
| 5,739,805 A | | 4/1998 | Dingwall |
| 6,396,540 B1 * | | 5/2002 | Ohkawara ............. 348/345 |
| 6,972,798 B1 * | | 12/2005 | Takei ................. 348/349 |
| 2001/0028402 A1 * | | 10/2001 | Sugimoto et al. ...... 348/345 |
| 2004/0218063 A1 * | | 11/2004 | Hattori et al. ....... 348/222.1 |

FOREIGN PATENT DOCUMENTS

| | | |
|---|---|---|
| JP | 08-223465 A | 8/1996 |
| JP | 2001-296470 A | 10/2001 |
| JP | 2004-219546 A | 8/2004 |
| JP | 2001-318307 A | 11/2004 |
| JP | 2005-502093 A | 1/2005 |
| KR | 1999-0039363 A | 6/1999 |

OTHER PUBLICATIONS

JP2005-502093 English Translation of Detailed Description of Claims.
Japanese Patent Office, Office Action issued Aug. 7, 2008.

* cited by examiner

*Primary Examiner*—W. B. Perkey
*Assistant Examiner*—Minh Phan
(74) *Attorney, Agent, or Firm*—Lowe Hauptman Ham & Berner

(57) ABSTRACT

The present invention relates to autofocusing apparatus of a camera. The autofocusing apparatus of a camera includes a lens section on which a light signal is incident; an image sensor and ISP section that receives the light signal incident on the lens section so as to convert into an electrical signal and then outputs digitalized image data; an autofocus DSP that receives the image data from the image sensor and ISP section so as to extract predetermined image components, divides the central region of a picture into N regions (N is an integer larger than two), calculates a focus value for each region by integrating the predetermined image components, and calculates the maximum value while moving the focus lens of the lens section in the up and down direction in accordance with the focus value calculated for each region; and a driving section that drives the focus lens of the lens section.

14 Claims, 7 Drawing Sheets

[FIG. 1]

- PRIOR ART -

[FIG. 2]

- PRIOR ART -

AUTOFOCUSING APPARATUS OF CAMERA AND AUTOFOCUSING METHOD THEREOF

CROSS-REFERENCE TO RELATED APPLICATIONS

The application claims the benefit of Korea Patent Application No. 2005-0062051 filed with the Korea Industrial Property Office on Jul. 11, 2005, the disclosure of which is incorporated herein by reference.

BACKGROUND OF THE INVENTION

1. Field of the Invention

The present invention relates to an autofocusing apparatus of a camera and an autofocusing method thereof, and more specifically, an autofocusing apparatus, which divides the central region of a picture or a window setting region into N regions to adjust the autofocus for each region so that a time required for autofocusing can be shortened, and an autofocusing method thereof.

2. Description of the Related Art

Recently, as the information technology rapidly develops, it is required to develop a composite mobile communication terminal having various functions added therein as well as a mobile communication terminal transmitting only a voice.

Accordingly, such a composite mobile communication terminal, in which a function of receiving and transmitting an image and a function of receiving and transmitting a voice are simultaneously provided, is being implemented. As the composite mobile communication terminal, there is provided a camera phone having a digital camera function implemented therein.

When a user wants to keep a certain sight, the user can take a picture by using a camera phone and store it therein.

The taken picture can be transmitted wirelessly to another mobile communication terminal. Further, the picture can be output on the screen of a PC or can be stored in the PC.

Recently, mobile communication terminals (so-called TV phone) have been developed, which can receive a TV broadcasting program to output, can download Internet information through the connection to the Internet, and can display a moving image. Further, a next-generation mobile communication terminal is being developed, which can perform all the above-described functions.

The construction of a general camera phone is composed of a camera module which takes a picture, a transmission module which transmits any one of a voice and image, and a reception module which receives any one of a voice and image.

The camera module includes a lens sub system and an image processing sub system.

The lens sub system includes a lens section composed of a zoom lens and focus lens, an actuator for driving the zoom or focus lens of the lens section, and an actuator driver.

The image processing sub system includes an image sensor and ISP, an autofocus digital signal processor (hereinafter, referred to as DSP) and the like.

The lens sub system adjusts the focus on an external sight to be taken, and causes light to be incident on the image sensor, the light being incident on a specific region of which the range is determined from the external sight to be taken.

The image sensor of the image processing sub system, composed of photo-cells in which electric charges are stored as a light source is incident during a specific absorption period, converts the stored electric charges into a digital value (pixel value) to output.

The ISP of the image processing sub system compresses the digital values with respect to the secured pixels, performs image processing such as scaling image enhancement, and transmits the processed digital value to a mobile phone main body.

In this case, the lens sub system adjusts the focus of a lens in order to take a clear image. At this time, an autofocusing apparatus, provided in a general camera or digital camera, is used as it is. The brief description thereof will be as follows.

In the auto-focusing apparatus of a general camera or digital camera, when a user sets a composition with respect to an object to be photographed and presses a release button, the focus is automatically adjusted so that photographing is performed.

Such an auto-focusing apparatus is roughly divided into an active type and passive type.

The active-type auto-focusing apparatus emits infrared rays or ultrasonic waves toward an object, and detects light or wave, which is reflected and incident from the object, so as to measure the distance with the object.

The passive-type auto-focusing apparatus which does not have a light emitting section receives light coming from an object through a lens section, and determines the distance with the object by using a brightness/darkness difference of the object.

In other words, the passive-type auto-focusing apparatus detects a high frequency signal, which is proportional to contrast obtained when a brightness signal passes through a high pass filter, for each frame among image signals coming from an image sensor. The obtained contrast is compared with the contrast of the previous frame, so that a focus lens is moved in the direction where the contrast becomes large and the rotation of the focus lens is stopped at a spot where contrast is the largest. Then, the focus is automatically adjusted.

In a general autofocus camera module, an image received through a CCD (Charged Coupled Device) or CMOS (Complementary Metal Oxide Semiconductor) sensor is processed by an ISP, and a focus value calculated through an edge obtained when the processed image is passed through a high pass filter (HPF) is extracted for each picture so as to be transmitted to a central processing unit (CPU). At this time, the CPU determines the moving direction and distance of the focus lens on the basis of the calculated focus value and gives an instruction to an actuator driver. Then, an actuator is driven to move the lens, so that the focus is automatically adjusted.

Figure 1:
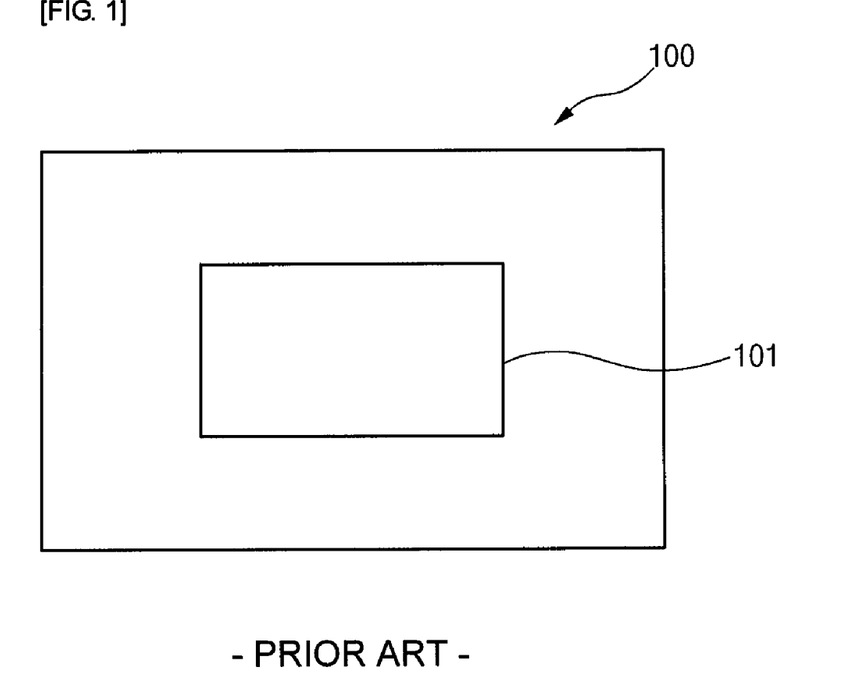
FIG. 1 is a diagram showing a window region within a picture.

FIG. 1 is a diagram showing a window 101 within a picture 100. As shown in FIG. 1, the central portion of a screen is generally set to the window 101. This is because most of users taking a picture pay attention to the central portion of a screen.

Further, the start and end positions of the window 101 from the autofocus DSP are transmitted to set the window 101 within the picture 100, and the high pass filter outputs of the window 101 set in such a manner are accumulated by an integrator.

The accumulated focus value becomes a reference for adjusting the focus in a camera module. In the case of a still image, a lens is moved to adjust the focus. Even in the same image, when the camera is in complete focus, a high focus value is obtained. Further, when the camera is not in focus, a low focus value is obtained. In general, the focus of a camera is adjusted on the basis of the center to which most of users pay attention.

The algorithm for finding a focus value is performed by a CPU within an autofocus DSP. The CPU determines which direction to move a lens so as to drive an actuator through an actuator driver.

Figure 2:
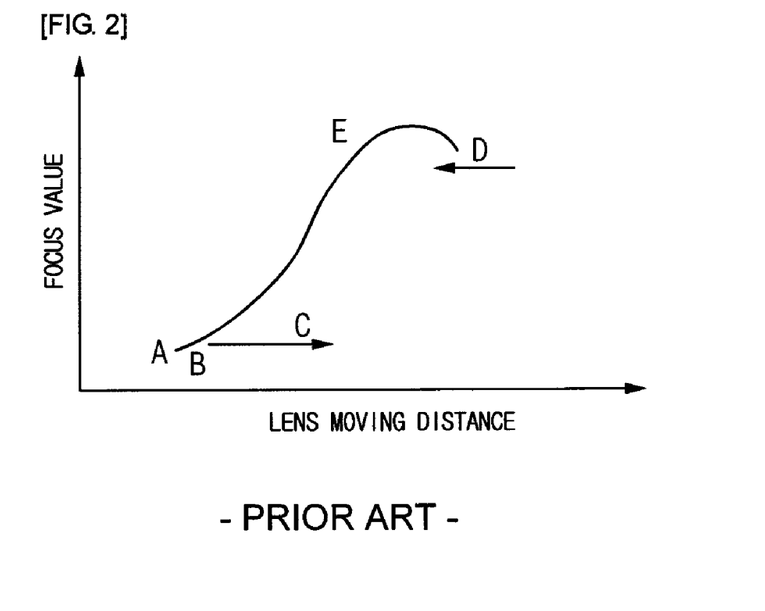
FIG. 2 is a graph showing a focus value in accordance with a lens moving distance.

FIG. 2 is a graph showing a focus value in accordance with a lens moving distance.

Although the same image is input to a camera, a low focus value is obtained as in a spot A, when the camera is not in focus. At this time, the moving direction of the lens is determined at a spot B so as to move the lens in a direction C. When the lens moving in the direction C is passed through a spot E having the maximum focus value, the lens is moved in a direction D, which is reverse to the direction C, and is fixed at the spot E to thereby find the maximum value.

In the related art, the focus value is calculated for each picture. This is because the total value of edge components of the window in which a user show an interest is output by the picture.

Therefore, in the conventional process in which the maximum value is found, the following process is repeated. The focus values of pictures are respectively calculated, the direction is determined on the basis of the calculated focus values, and the lens is moved to the direction.

Accordingly, the faster the frame rate, the shorter the autofocusing time, the frame rate meaning speed in which a picture is shown per a unit time.

Meanwhile, as an image sensor which can be used in a conventional camcorder or digital camera, there are provided a CCD (Charge Coupled Device) or CMOS (Complementary Metal Oxide Semiconductor) sensor.

Here, the CCD image sensor, in which a plurality of microminiature metal electrodes are arranged on a silicon wafer, is composed of multiple optical diodes. When light is applied to the CCD image sensor, optic energy is converted into electricity. The electrical charge generated by the photodiode provided in each pixel is transmitted to an amplifier through a vertical transmission CCD and horizontal transmission CCD by using a high potential difference. Therefore, although the power consumption of the CCD image sensor is large, the CCD image sensor is so strong to noise that the amplification is uniformly performed.

On the other hand, the CMOS image sensor, in which a photodiode and amplifier are installed in each pixel, has lower power consumption and is smaller in size than the CCD image sensor. However, the CMOS image sensor has a low image quality.

Therefore, in a conventional camcorder or digital camera, the CCD image sensor has been frequently used, which is strong to noise and has a high image quality. Since the CCD image sensor has a fast frame rate, in which 50 to 60 VGA (640×480) or SD (720×48) pictures are shown per second, it is possible to find the maximum value within a considerably short time.

However, as the image quality of the CMOS image sensor is improved, the CMOS image sensor, which has low power consumption and is favorable to miniaturization, is increasingly used in mobile phones, smart phones, PDA and the like. Accordingly, a time for finding the maximum focus value, that is, the autofocusing time is lengthened.

In other words, the frame rate of the CMOS image sensor is as slow as 30 pictures per second, and users demand an image quality with higher resolution. Therefore, the frame rate of the CMOS image sensor becomes much slower, so that the autofocusing time is considerably lengthened.

SUMMARY OF THE INVENTION

An advantage of the present invention is that it provides an autofocusing apparatus, which divides the central region of a picture or a window setting region into N regions to adjust auto-focus for each region so that a time required for autofocusing can be shortened, and an autofocusing method thereof.

Additional aspects and advantages of the present general inventive concept will be set forth in part in the description which follows and, in part, will be obvious from the description, or may be learned by practice of the general inventive concept.

According to an aspect of the invention, an autofocusing apparatus of a camera includes a lens section on which a light signal is incident; an image sensor and ISP section that receives the light signal incident on the lens section so as to convert into an electrical signal and then outputs digitalized image data; an autofocus DSP that receives the image data from the image sensor and ISP section so as to extract predetermined image components, divides the central region of a picture into N regions (N is an integer larger than two), calculates a focus value for each region by integrating the predetermined image components, and calculates the maximum value while moving the focus lens of the lens section in the up and down direction in accordance with the focus value calculated for each region; and a driving section that drives the focus lens of the lens section.

Each of the N regions is composed of an extraction and integration line region which extracts predetermined image components and integrates the extracted predetermined image components, an algorithm operation line region which calculates a focus value in accordance with the integrated value of the predetermined image components, and a lens driving line region which drives the focus lens of the lens section in the up and down direction in accordance with the calculated focus value.

The extraction and integration line region, which extracts predetermined image components and integrates the extracted predetermined image components, is composed of lines based on multiples of 8.

The autofocus DSP includes an optical detection module that receives image data from the image sensor and ISP section so as to extract predetermined image components, divides the central region of a picture into N regions, and then calculates a focus value for each region by integrating the predetermined image components; and a central processing unit that receives the focus value from the optical detection module and calculates the maximum focus value while driving the focus lens of the lens section in the up and down direction in accordance with the focus value (an autofocusing algorithm).

The optical detection module includes a high pass filter that receives image data from the image sensor and ISP section so as to extract predetermined image components; an integrator that receives the predetermined image components extracted from the high pass filter, divides the central region of a picture into N regions, and integrates the predetermined image components for each region to output; and a central region setting section that transmits the start and end addresses of the central region of the picture, the start and end addresses being set in the integrator.

One of the predetermined image components is an edge component.

One of the predetermined image components is a Y component.

One of the predetermined image components is a Y component with the maximum value.

The central region of the picture is a window region.

The image sensor is a CMOS image sensor.

According to another aspect of the invention, an autofocusing method of a camera includes receiving a light signal incident on a lens section so as to convert into an electrical signal and then outputting digitalized image data; receiving the output image data so as to extract predetermined image components, dividing the central region of a picture into N regions (N is an integer larger than two), and calculating a focus value for each region by integrating the predetermined image components; and calculating the maximum focus value while driving the focus lens of the lens section in the up and down direction in accordance with the calculated focus value.

The steps of calculating a focus value and calculating the maximum focus value are performed in a plurality of lines composing each of the N regions.

The step of calculating a focus value includes receiving image data so as to extract predetermined image components; dividing the central region of a picture into N regions and transmitting the start and end addresses of each region; and calculating a focus value by integrating the predetermined image components for each of the N regions.

The steps of extracting and integrating predetermined image components are performed for lines based on multiples of 8.

One of the predetermined image components is an edge component.

One of the predetermined image components is a Y component.

One of the predetermined image components is a Y component with the maximum value.

The central region of the picture is set to a window region.

The image sensor is a CMOS image sensor.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Hereinafter, preferred embodiments of the present invention will be described in detail with reference to the accompanying drawings.

First Embodiment

Figure 3:
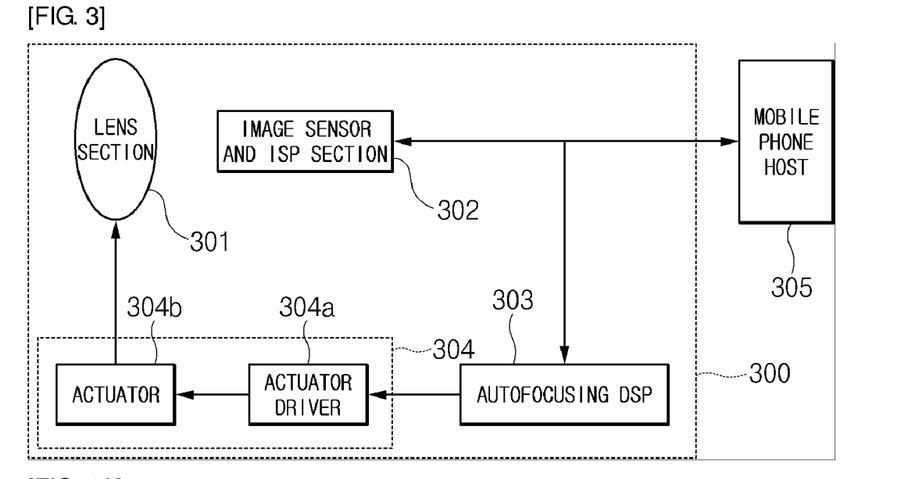
FIG. 3 is a diagram showing the construction of an autofocusing apparatus according to the present invention.

FIG. 3 is a diagram showing the construction of an autofocusing apparatus 300 according to the present invention.

As shown in FIG. 3, the autofocusing apparatus 300 is composed of a lens section 301 on which a light signal is incident, an image sensor and ISP section 302 which receives the light signal incident on the lens section 301 to convert into an electrical signal and then outputs digitalized image data, an autofocus digital signal processor 303 (hereinafter, referred to as the autofocus DSP) which receives the image data from the image sensor and ISP section 302 so as to extract predetermined image components, divides the center region of a picture into N regions (N is an integer larger than two) so as to calculate a focus value for each region by integrating the predetermined image components, and calculates the maximum focus value while driving a focus lens of the lens section 301 in the up and down direction in accordance with the focus value calculated for each region, and a driving section 304 including an actuator 304b which drives the focus lens of the lens section 301 and an actuator driver 304a which drives the actuator 304b.

The lens section 301 is composed of a zoom lens and a focus lens. The zoom lens serves to enlarge an image, and the focus lens serves to adjust the focus of an image.

The image sensor and ISP (Image signal processor) section 302 is composed of an image sensor and an ISP. As the image sensor, a CCD image sensor or CMOS image sensor is used, which converts an optical signal into an electrical signal. In the present invention, it is preferable to use a camera module in which the CMOS image sensor is used, in order to reduce an autofocusing time.

The ISP carries out auto white balance, auto exposure, gamma correction and the like to improve an image quality, so that image data are converted in accordance with the sense of sight. Further, the ISP outputs the image data with an improved image quality.

Since there are provided various kinds of CCD image sensors or CMOS image sensors, an interface and characteristic for the ISP are different according to each maker. Accordingly, the ISP is manufactured differently according to the kind of each image sensor.

Here, the ISP carries out image processing such as color filter array interpolation, color matrix, color correction, color enhancement and the like.

The processed data are converted into CCIR656 or CCIR601 format (YUV space). Then, the ISP receives a master clock from a mobile-phone host 305 so as to output Y/Cb/Cr or R/G/B data as well as a vertical synchronizing signal, horizontal synchronizing signal, and pixel clock signal.

Figure 4A:
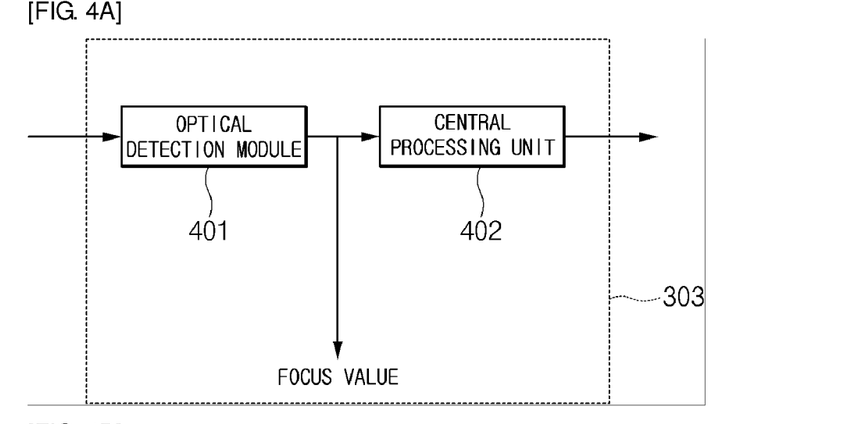
FIG. 4A is a diagram showing the construction of an autofocusing DSP shown in FIG. 3.
Figure 4B:
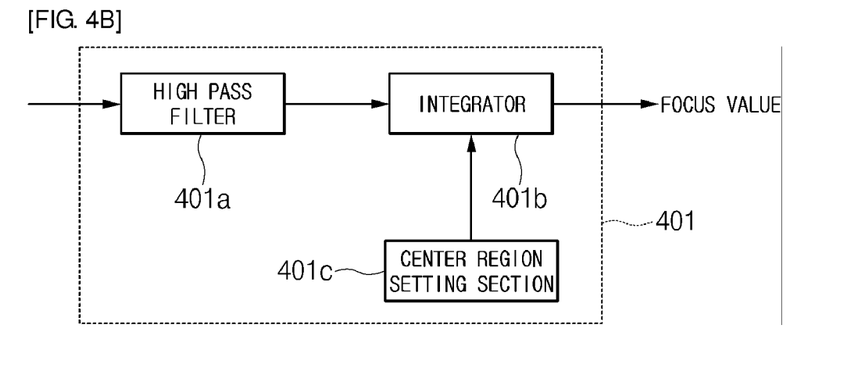
FIG. 4B is an internal block diagram showing an optical detection module according to a first embodiment of the invention.

FIG. 4A is a diagram showing the construction of the autofocus DSP of FIG. 3. FIG. 4B is a block diagram showing an optical detection module according to the first embodiment of the invention.

As shown in FIG. 4A, the autofocus DSP 303 is composed of an optical detection module 401 which receives image data from the image sensor and ISP section 302 so as to extract predetermined image components, divides the center of a picture into N regions, and calculates a focus value by integrating the predetermined image components for each region and a central processing unit 402 which receives the focus value from the optical detection module 401 and calculates the maximum focus value while driving the focus lens of the lens section 301 in the up and down direction in accordance with the focus value. That is, the central processing unit 402 performs an autofocusing algorithm.

As shown in FIG. 4B, the optical detection module 401 is composed of a high pass filter 401a which receives image data from the image sensor and ISP section 302 so as to extract predetermined image components, an integrator 401b which receives the predetermined image components extracted from the high pass filter 401a, divides the center of a picture into N regions, and integrates the predetermined image components for each region to output, and a central region setting section 401c which transmits the start and end addresses of the central region of a picture, the start and end addresses being set in the integrator 401b.

If the image data transmitted from the image sensor and ISP section 302 is input to the autofocus DSP 303 and is then passed through the high pass filter 401a, only predetermined components of the image are extracted. As the extracted predetermined components of the image, there are an edge component, Y component, and Y component having the maximum value.

If the central region setting section 401c transmits the start and end positions of the central region within the picture, the components extracted through the high pass filter 401a are accumulated by the integrator 401b. The focus value accumulated in such a manner is set to reference data for adjusting a focus in a camera module.

In a case of a still image, a focus is adjusted by moving the lens 301. Even in the same image, when a focus is adjusted, the focus value is high, and when a focus is not adjusted, the focus value is low. Accordingly, in order to find the maximum focus value, a place of which the focus value is the maximum should be found while driving the actuator 304b through the actuator driver 304a so as to move the lens 301.

The above-described algorithm where a focus value is found is carried out by the central processing unit 402. In this case, the central processing unit 402 determines which direction to move the lens 301 so as to control the driving section 304 composed of the actuator driver 304a and the actuator 304b.

Figure 5A:
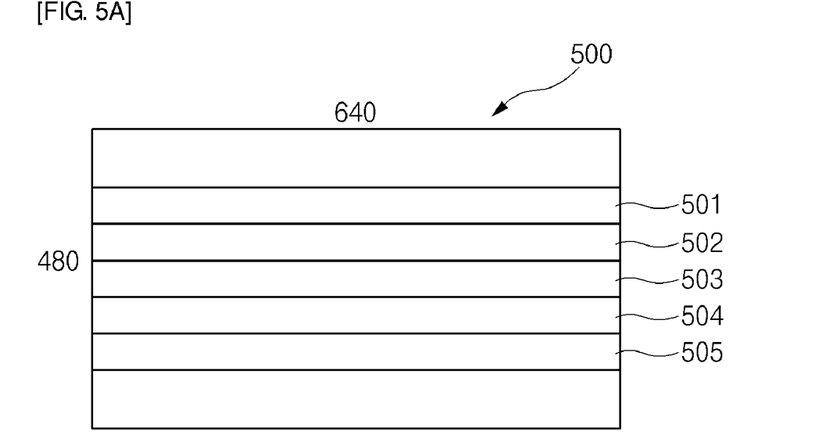
FIG. 5A is a diagram showing a VGA (640×480)-quality picture of the first embodiment according to the invention.
Figure 5B:
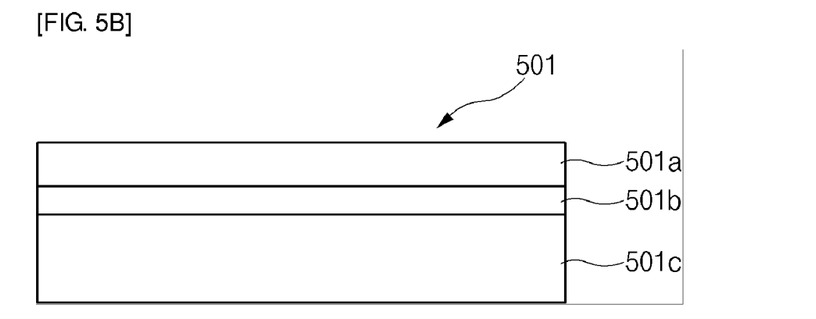
FIG. 5B is a diagram showing one region of N regions of the first embodiment according to the invention.

FIG. 5A is a diagram showing a VGA (640×480)-quality picture 500 of the first embodiment according to the invention, and FIG. 5B is a diagram showing one region 501 among N regions of the central area within the picture 500.

As shown in FIG. 5A, the central area of the picture is divided into N regions (here, five regions 501 to 505), of which each has its own focus value.

The central area of the picture means a region where, when the picture is divided into an upper and lower portion with reference to the central line thereof, a region from the central line to a line indicating one half of the upper portion and a region from the central line to a line indicating one half of the lower portion are put together.

As shown in FIG. 5B, each of the N regions is composed of a extraction and integration line region 501a which extracts an edge, Y component, and Y component with the maximum value and integrates the extracted components, an algorithm operation line region 501b which calculates a focus value according to the integrated value of the components, and a lens driving line region 501c which drives the focus lens of the lens section in the up and down direction in accordance with the calculated focus value.

The extraction and integration line region 501a, which extracts an edge, Y component, and Y component with the maximum value and integrates the extracted components, is composed of lines based on multiples of 8. The reason will be explained as follows.

A camera module including an autofocusing apparatus includes a compression module (not shown) which compresses image data input from the image sensor and ISP section. The compression module blocks the input image data into an 8×8 unit region corresponding to a unit region composed of a constant number of pixels, outputs the blocked image data, and frequency-converts the blocked image data through discrete cosine transform (DCT) so as to output a frequency component corresponding to each block. Therefore, since a unit block with 8×8 pixels becomes a basic unit for encoding the input image data, it is preferable that the extraction and integration line region 501a, which extracts an edge, Y component, and Y component with the maximum value and integrates the extracted components, is composed of lines based on multiples of 8.

In the present invention as shown in FIGS. 5A and 5B, one picture is divided into N regions, a focus value is calculated for each region, and the maximum focus value is searched by moving a lens in accordance with the calculated focus value. Therefore, it can be found the movement of the lens is performed N times for one picture. Accordingly, even in a camera module using a CMOS image sensor of which the frame rate is considerably low, it is possible to expect a quick autofocusing time.

Figure 6A:
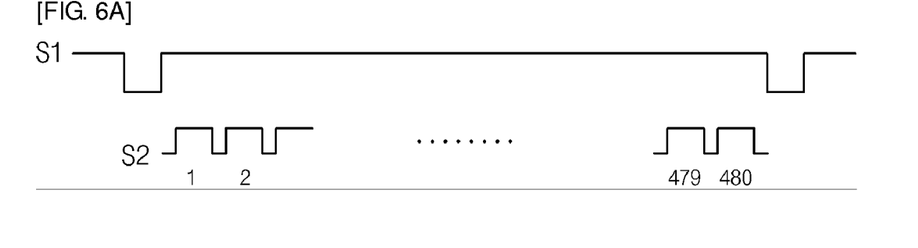
FIG. 6A is a diagram showing a signal used as a synchronizing signal of a picture according to the invention.

FIG. 6A is a diagram showing a signal which is used as a synchronizing signal of a picture according to the present invention. As shown in FIG. 6A, the signal used as a synchronizing signal of a picture is composed of a vertical synchronizing signal S1 which informs the start of the picture, a horizontal synchronizing signal S2 which informs the activated state of a line image present in the picture, and a pixel clock signal (not shown) which informs the synchronization of respective pixel data.

Figure 6B:
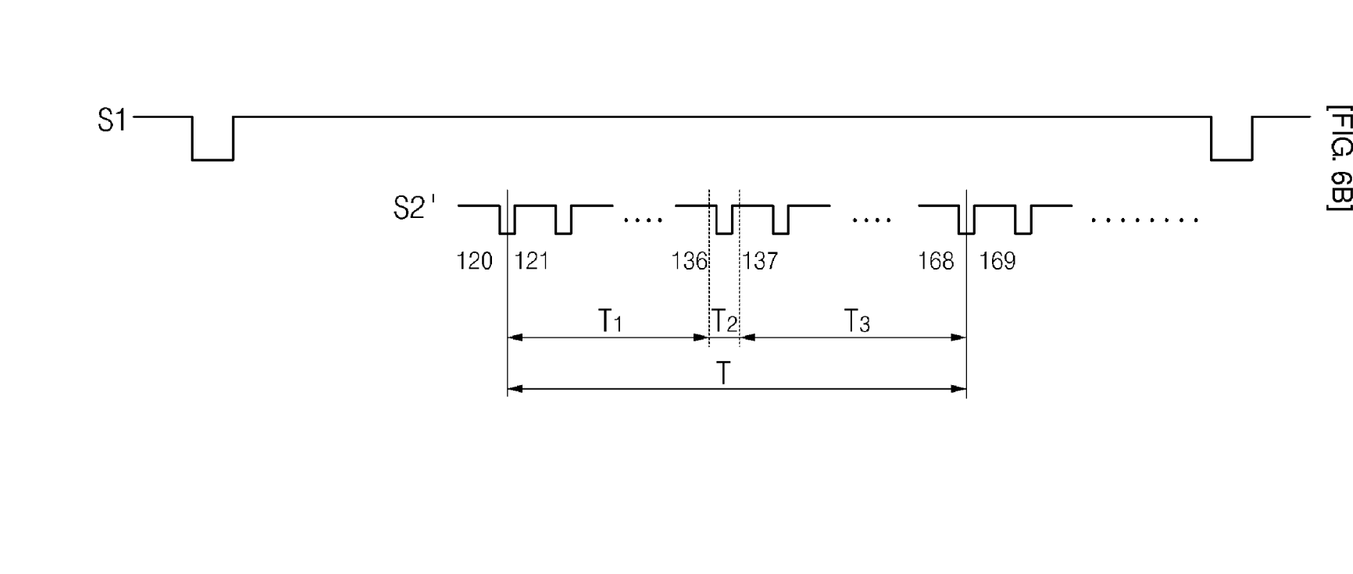
FIG. 6B is a diagram showing an autofocusing time in one region of the N regions according to the invention.

FIG. 6B is a diagram showing an autofocusing time T in one of N regions according to the invention.

As shown in FIG. 6B, if a vertical synchronizing signal S1 and horizontal synchronizing signal S2' corresponding to one of N regions are applied to one of the N rgegions, the autofocusing time T in one of the N regions can be expressed by the sum of $T_1$, $T_2$, and $T_3$. Here, $T_1$ means a time in which an edge component, Y component, and Y component with the maximum value are extracted and integrated, $T_2$ means a time in which the autofocus DSP performs an algorithm in accordance with the integrated value of the components so as to calculate a focus value, and $T_3$ means a time in which the focus lens of the lens section is driven in the up and down direction in accordance with the calculated focus value.

Therefore, in the 121st to 136th lines of the picture, an edge component, Y component, and Y component with the maximum value are extracted and integrated. In the 136th to 137th lines, the algorithm is performed in accordance with the integrated value of the components so as to calculate a focus value. In the 138th to 168th lines, the focus lens of the lens section is driven in accordance with the calculated focus value.

Figure 8A:
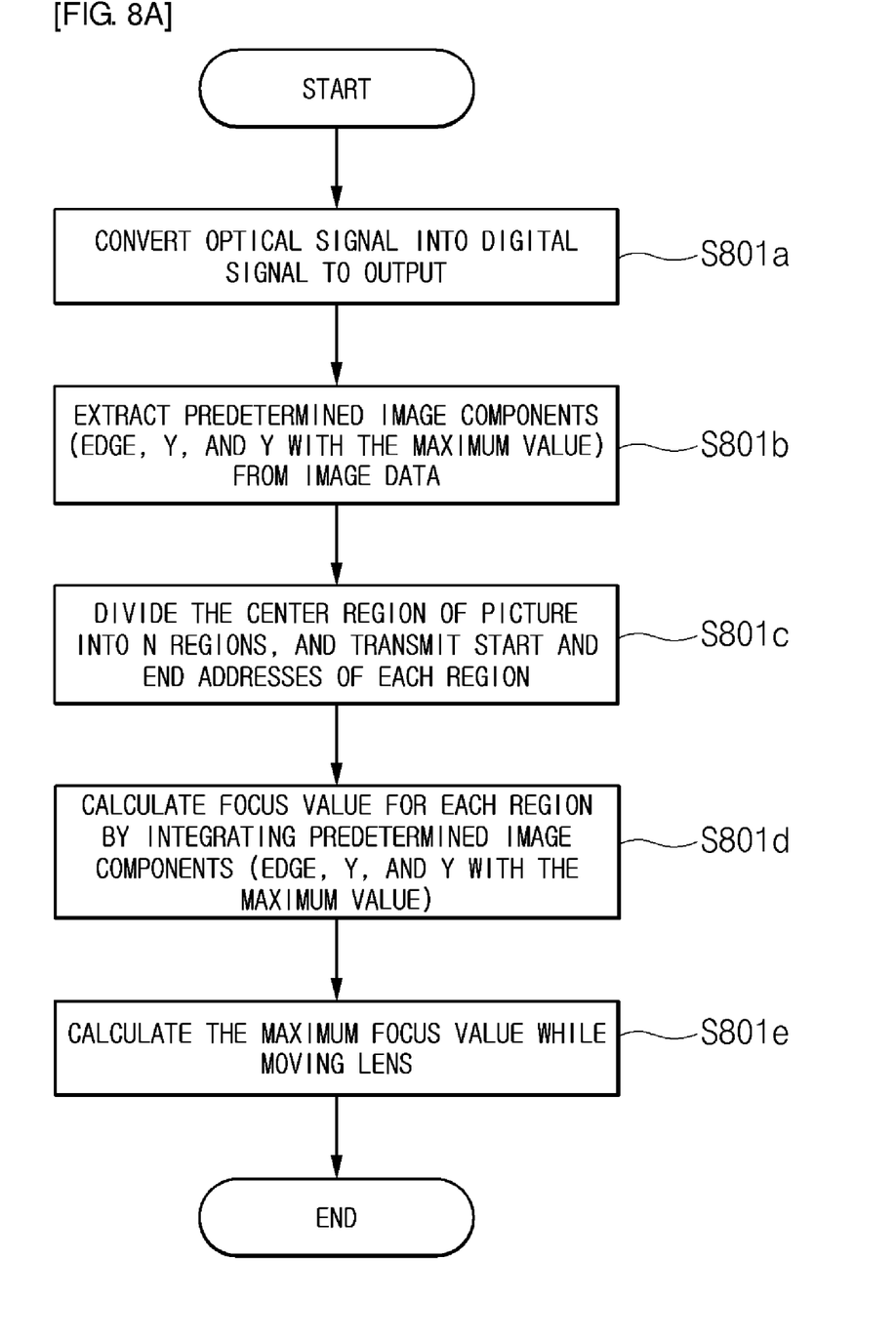
FIG. 8A is a flow chart showing an autofocusing method of a camera according to the first embodiment of the invention.

FIG. 8A is a flow chart showing an autofocusing method of a camera according to the first embodiment of the invention. As shown in FIG. 8A, the autofocusing method can be divided into five steps.

First, the image sensor and ISP section converts an optical signal into a digital signal to output (S801a).

Next, the autofocus DSP extracts predetermined image components (edge, Y, and Y with the maximum value) from image data (S801b).

Next, the autofocus DSP divides the central region of a picture into N regions and transmits the start and end addresses of each region (S801c).

Next, the autofocus DSP integrates the predetermined image components (edge, Y, and Y with the maximum value) for each region so as to calculate a focus value (S801d).

Finally, the autofocus DSP calculates the maximum focus value while moving the lens (S801e).

Second Embodiment

The construction of an autofocusing apparatus of a camera according to a second embodiment of the invention is almost the same as that of the first embodiment, shown in FIGS. 3, 4A and 4B. In the second embodiment, however, a window setting region within a picture is divided into N regions, predetermined image components are integrated for each region so as to calculate a focus value, and the maximum value is calculated while the focus lens of the lens section 301 is driven up and down in accordance with the focus value calculated for each region. Therefore, the construction of an optical detection module 401 composing the autofocus DSP 303 is slightly different from that of the first embodiment.

Figure 4C:
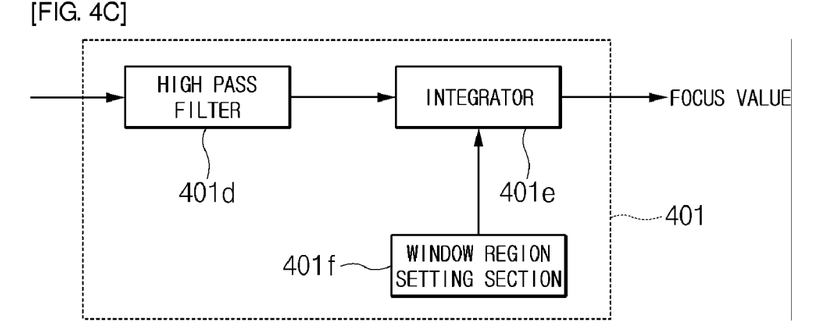
FIG. 4C is an internal block diagram showing an optical detection module according to a second embodiment of the invention.

FIG. 4C is a diagram showing the optical detection module 401 according to the second embodiment. As shown in FIG. 4C, the optical detection module 401 is composed of a high pass filter 401d which receives image data from the image sensor and ISP section 302 so as to extract predetermined image components, an integrator 401e which receives the predetermined image components extracted from the high pass filter 401d, divides a window setting region into N regions, and integrates the predetermined image components for each region to output, and a window region setting section 401f which transmits the start and end addresses of the window region, the start and end addresses being set in the integrator 401e.

Therefore, if the window region setting section 401f transmits the start and end positions of the window region, the integrator 401e accumulates the components extracted through the high pass filter 401d.

Figure 7A:
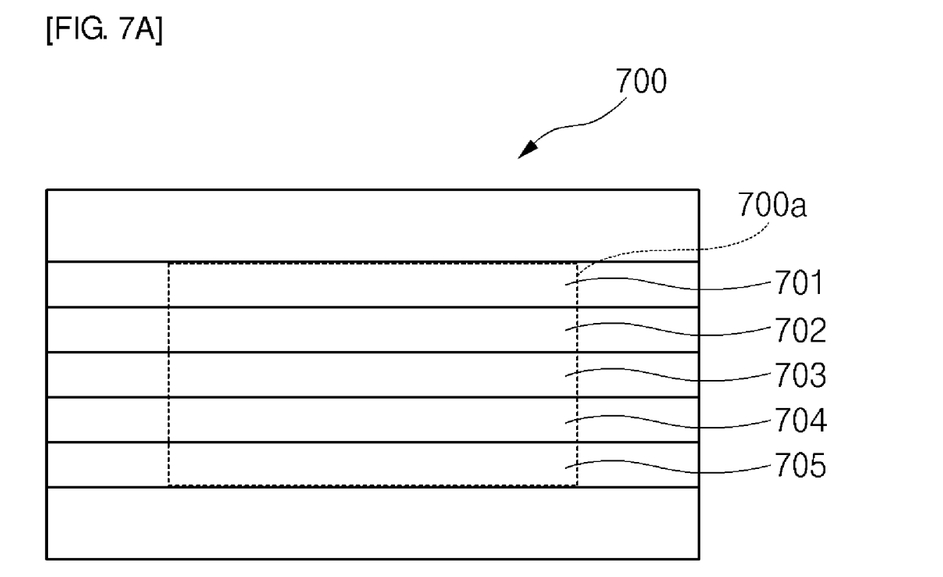
FIG. 7A is a diagram showing a VGA (640×480)-quality picture of the second embodiment according to the invention.
Figure 7B:
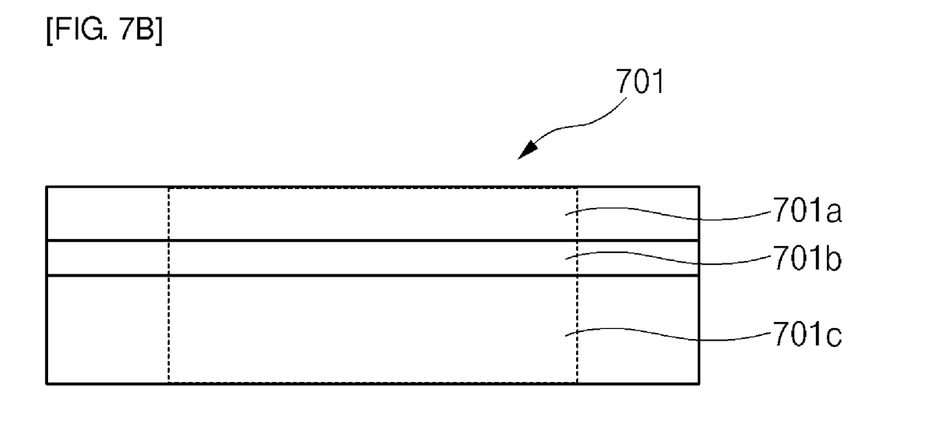
FIG. 7B is a diagram one region of N regions of the first embodiment according to the invention.

FIG. 7A is a diagram showing a VGA (640×480)-quality picture 700 according to the second embodiment of the invention. FIG. 7B is a diagram showing one region 701 of N regions of the window region 700a.

As shown in FIG. 7A, the window region 701a is divided into N regions (here, five regions 701 to 705) of which each is set to have its own focus value.

The window region 701a means a portion to which most of users taking a photograph pay attention. In general, the central portion of a screen is set to the window region 701a.

As shown in FIG. 7B, each of the N regions is composed of a extraction and integration line region 701a which extracts an edge, Y component, and Y component with the maximum value and integrates the extracted components, an algorithm operation line region 701b which calculates a focus value according to the integrated value of the components, and a lens driving line region 701c which drives the focus lens of the lens section in the up and down direction in accordance with the calculated focus value.

The extraction and integration line region 701a, which extracts an edge, Y component, and Y component with the maximum value and integrates the extracted components, is composed of lines based on multiples of 8, similar to the first embodiment.

In the second embodiment of the invention, the window setting region within one picture is divided into N regions, a focus value is calculated for each region, and the maximum focus value is searched by moving the lens in accordance with the calculated focus value, similar to the first embodiment. Therefore, it can be found that the movement of the lens is performed N times for one picture. Accordingly, even in a camera module using a CMOS image sensor of which the frame rate is considerably low, it is possible to expect an autofocusing time.

A synchronizing signal of picture and an autofocusing time T in one of N regions of the window region according to the second embodiment of the invention are the same as those of the first embodiment, shown in FIGS. 6A and 6B. However, since the number of image pixels composing one of the N regions of the window region is smaller than the number of image pixels composing one region in the central region within the picture, the autofocusing time in the second embodiment can be shortened in comparison with that of the first embodiment.

Figure 8B:
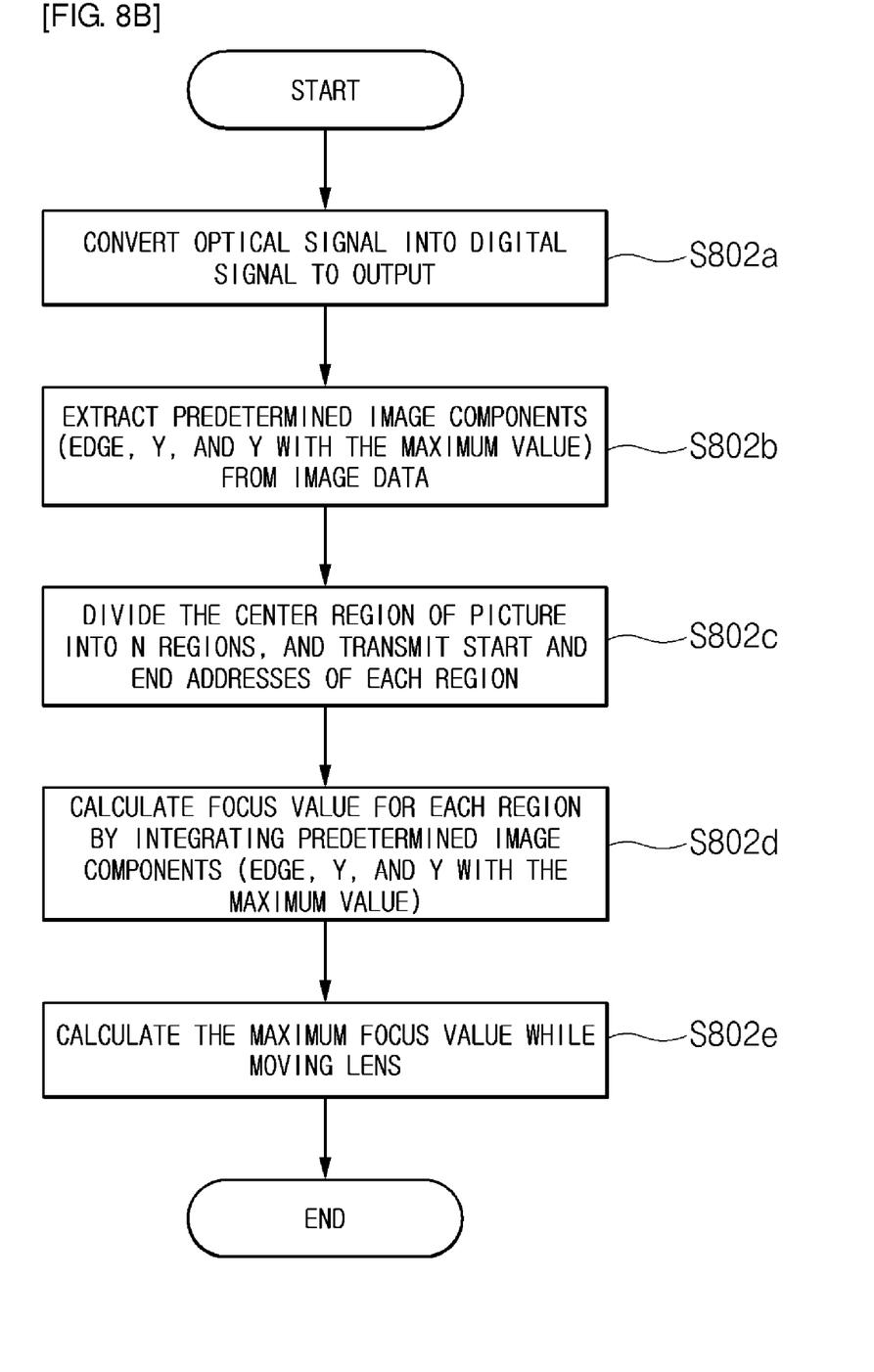
FIG. 8B is a flow chart showing an autofocusing method of a camera according to the second embodiment of the invention

FIG. 8B is a flow chart showing an autofocusing method of a camera according the second embodiment of the invention. As shown in FIG. 8B, the autofocusing method of a camera can be also divided into five steps.

First, the image sensor and ISP section converts an optical signal into a digital signal to output (S802a).

Next, the autofocus DSP extracts predetermined image components (edge, Y, and Y with the maximum value) from image data (S802b).

Next, the autofocus DSP divides the window setting region into N regions and transmits the start and end addresses of each region (S802c).

Next, the autofocus DSP integrates the predetermined image components (edge, Y, and Y with the maximum value) for each region so as to calculate a focus value (S802d).

Finally, the autofocus DSP calculates the maximum value while moving the lens (S802e).

According to the autofocusing apparatus and the autofocusing method of a camera as described above, the central region of the picture or the window setting region is divided into N regions so that autofocusing is performed for each region, which makes it possible to shorten an autofocusing time.

Recently, as the image quality of a CMOS image sensor is improved, a CMOS image sensor, which has low power consumption and is favorable for miniaturization, is used in mobile phones, smart phones, PDAs and the like. Therefore, the present invention has a more significant advantage than the related art in that it is possible to prevent an autofocusing time from being lengthened due to low frame rate of the CMOS image sensor.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An autofocusing apparatus of a camera comprising:

a lens section on which a light signal is incident;

an image sensor and ISP section that receives the light signal incident on the lens section so as to convert into an electrical signal and then outputs digitalized image data;

an autofocus digital signal processor that receives the image data from the image sensor and ISP section so as to extract predetermined image components, divides the central region of a picture into N regions (N is an integer larger than two), calculates a focus value for each region by integrating the predetermined image components, and calculates the maximum value while moving the focus lens of the lens section in the up and down direction in accordance with the focus value calculated for each region; and a driving section that drives the focus lens of the lens section;

wherein each of the N regions is composed of an extraction and integration line region which extracts predetermined image components and integrates the extracted predetermined image components, an algorithm operation line region which calculates a focus value in accordance with the integrated value of the predetermined image components, and a lens driving line region which drives the focus lens of the lens section in the up and down direction in accordance with the calculated focus value; and wherein the extraction and integration line region, which extracts predetermined image components and integrates the extracted predetermined image components, is composed of lines based on multiples of 8.

2. The autofocusing apparatus of a camera according to claim 1, wherein the autofocus digital signal processor includes:

an optical detection module that receives image data from the image sensor and ISP section so as to extract predetermined image components, divides the central region of a picture into N regions, and then calculates a focus value for each region by integrating the predetermined image components; and a central processing unit that receives the focus value from the optical detection module and calculates the maximum focus value while driving the focus lens of the lens section in the up and down direction in accordance with the focus value.

3. The autofocusing apparatus of a camera according to claim 2, wherein the optical detection module includes:

a high pass filter that receives image data from the image sensor and ISP section so as to extract predetermined image components;

an integrator that receives the predetermined image components extracted from the high pass filter, divides the central region of a picture into N regions, and integrates the predetermined image components for each region to output; and a central region setting section that transmits the start and end addresses of the central region of the picture, the start and end addresses being set in the integrator.

4. The autofocusing apparatus of a camera according to claim 1, wherein one of the predetermined image components is an edge component.

5. The autofocusing apparatus of a camera according to claim 1, wherein one of the predetermined image components is a Y component.

6. The autofocusing apparatus of a camera according to claim 1, wherein one of the predetermined image components is a Y component with the maximum value.

7. The autofocusing apparatus of a camera according to claim 1, wherein the central region of the picture is a window region.

8. The autofocusing apparatus of a camera according to claim 1, wherein the image sensor is a CMOS image sensor.

9. An autofocusing method of a camera comprising:

receiving a light signal incident on a lens section so as to convert into an electrical signal and then outputting digitalized image data;

receiving the output image data so as to extract predetermined image components, dividing the central region of a picture into N regions (N is an integer larger than two), and calculating a focus value for each region by integrating the predetermined image components; and calculating the maximum focus value while driving the focus lens of the lens section in the up and down direction in accordance with the calculated focus value;

wherein the steps of calculating a focus value and calculating the maximum focus value are performed in a plurality of lines composing each of the N regions, wherein the step of calculating a focus value includes:

receiving image data so as to extract predetermined image components;

dividing the central region of a picture into N regions and transmitting the start and end addresses of each region; and calculating a focus value by integrating the predetermined image components for each of the N regions, wherein the steps of extracting and integrating predetermined image components are performed for lines based on multiples of 8.

10. The autofocusing method of a camera according to claim 9, wherein one of the predetermined image components is an edge component.

11. The autofocusing method of a camera according to claim 9, wherein one of the predetermined image components is a Y component.

12. The autofocusing method of a camera according to claim 9, wherein one of the predetermined image components is a Y component with the maximum value.

13. The autofocusing method of a camera according to claim 9, wherein the central region of the picture is set to a window region.

14. The autofocusing method of a camera according to claim 9, wherein the image sensor is a CMOS image sensor.

* * * * *